Patented June 24, 1930

1,767,178

UNITED STATES PATENT OFFICE

HORACE T. HERRICK, ORVILLE E. MAY, AND HARRY W. TITUS, OF WASHINGTON, DISTRICT OF COLUMBIA; SAID MAY AND SAID TITUS ASSIGNORS TO SAID HERRICK

FEED

No Drawing.	Application filed August 15, 1928. Serial No. 299,870.

This invention relates to the use of calcium gluconate, both for its nourishing and therapeutic value, in poultry and cattle feeds; either alone or in combination or mixed in any proportions, with other nutrient material such as the several cereal grains, various other seeds such as sunflower, hemp seed, etc., by-products of the packing-house and dairy industries, mineral supplements, both natural and artificial, and any and all combinations of the foregoing or any other nutrient material in any state or condition or with inert materials such as water, sand, or any other substances which may be used other than as nutrients. In addition to the above, roughages and forages, ensilages, legumes, hays, and by-products of the vegetable oil industries may be used in combinations or mixtures with calcium gluconate as a stock feed.

Calcium gluconate may be used alone or in the above mixtures as a satisfactory source of calcium for young and mature poultry. Experience has shown that hens having a high annual egg production have a tendency to lay eggs with shells which are thin and of poor texture, especially during the maximum production period. We have found that if such hens are fed feeds composed wholly or in part of calcium gluconate, the shells of the eggs then produced are of good quality and texture.

*Example 1.*—We have fed calcium gluconate in capsules to hens previously laying eggs with shells which were both thin and of poor texture. Shortly thereafter a marked improvement both in thickness and quality was shown in the shells of the eggs laid by these hens.

*Example 2.*—We fed a mash containing calcium gluconate and other nutrient ingredients such as a standard poultry feed to hens previously laying eggs with shells which were thin and poor in texture, and noted a marked improvement in the thickness and texture of the shells of the eggs laid by such hens shortly thereafter.

The meaning of the word "feed" as now used by animal husbandmen and students of animal nutrition is the same as that of food with the restriction that feed be used when reference is made to animals and food be used when reference is made to mankind. Therefore, the word "feed" as used herein and in the claims is defined as any substance which supplies material needed by the living animal. This definition includes oxygen from the air, water, and both organic and inorganic salts, as well as carbohydrates, fats, proteins, etc. The definition, then, really includes all substances, organic or inorganic, which may be used by the animal for the maintenance of life and for continued procreation.

The word "feed" is also used to designate a certain quantity of food given to animals at one time, as contrasted with the word ration which means the amount of feed supplied per day.

We claim:

1. A feed consisting solely of calcium gluconate.

2. A feed including calcium gluconate as its essential ingredient.

HORACE T. HERRICK.
ORVILLE E. MAY.
HARRY W. TITUS.